United States Patent
Du

[11] Patent Number: 6,091,560
[45] Date of Patent: Jul. 18, 2000

[54] LOW FREQUENCY SIGNAL BASELINE SHIFT COMPENSATION IN A DISC DRIVE

[75] Inventor: Ke Du, Oklahoma City, Okla.

[73] Assignee: Seagate Technology, Inc., Scotts Valley, Calif.

[21] Appl. No.: 08/960,797

[22] Filed: Oct. 30, 1997

Related U.S. Application Data

[60] Provisional application No. 60/055,896, Aug. 15, 1997.

[51] Int. Cl.[7] .................................................. G11B 5/09
[52] U.S. Cl. .......................... 360/53; 360/25; 360/65; 360/46; 360/77.08; 360/78.14; 360/75
[58] Field of Search .............................. 360/65, 46, 53, 360/77.08, 78.14, 75, 25

[56] References Cited

U.S. PATENT DOCUMENTS

5,684,651  11/1997  Yaegashi et al. .................... 360/67 X
5,790,335   8/1998  Sugawara et al. .................... 360/65 X

*Primary Examiner*—Alan T. Faber
*Attorney, Agent, or Firm*—Crowe & Dunlevy

[57] ABSTRACT

An apparatus and method for removing baseline shift in low frequency readback signals of a disc drive, such signals characterized by peaks separated by baseline portions. The disc drive comprises a head controllably positionable adjacent tracks on a rotatable disc, a servo circuit which controls the position of the head in response to the readback signals and an adjustable filter operably connected to and serially disposed between the head and the servo circuit. When baseline shift is detected in the baseline portions of the readback signals at a predetermined margin threshold, the response characteristics of the adjustable filter are adjusted to remove the detected baseline shift from the readback signals.

8 Claims, 8 Drawing Sheets

LOW FREQUENCY SIGNAL BASELINE SHIFT COMPENSATION IN A DISC DRIVE

RELATED APPLICATIONS

This application claims priority to Provisional Application No. 60/055,896 entitled MR HEAD BASELINE SHIFTING COMPENSATION AND ITS APPLICATIONS, filed Aug. 15, 1997.

FIELD OF THE INVENTION

This invention relates generally to the field of disc drive storage devices, and more particularly, but not by way of limitation, to compensating for baseline shift in low frequency readback signals of a disc drive.

BACKGROUND OF THE INVENTION

Hard disc drives are used in modern computer systems to enable users to store and retrieve vast amounts of data in a fast and efficient manner.

In a typical disc drive, one or more magnetic discs are rotated at a constant high speed and accessed by a rotary actuator assembly having a plurality of read/write heads that fly adjacent the surfaces of the discs on air bearings established by air currents set up by the rotation of the discs. Each head includes a write element that selectively magnetizes data fields defined on tracks on the corresponding disc surface during a write operation, and a read element that detects the selective magnetization of the data fields during a read operation. A read/write channel and an interface circuit, responsive to the heads, are provided to transfer the data between the discs and a host computer in which the disc drive is mounted.

A closed loop digital servo system is used to control the position of the heads relative to the tracks through the application of current to a coil of a voice coil motor. The tracks are defined from servo information written to servo fields on the surfaces of the discs during manufacturing. The data fields are subsequently arranged between adjacent servo fields during a disc drive formatting operation. The servo information typically includes gain control, synchronization, track address, radial position (index) and position information stored in associated fields. Thus, during operation of the disc drive the servo information is periodically sampled from the servo fields and used to control the position of the heads with respect to the tracks.

The frequency at which data are written to the data fields is selected to be as high as practicable in order to maximize data transfer characteristics of the disc drive. The use of magneto-resistive (MR) heads and partial response, maximum likelihood (PRML) read channel detection techniques have allowed disc drives of the present generation to write and read data at frequencies of up to 200 megahertz (MHZ). Typically, however, the servo information is written at a substantially lower frequency, such 20 MHZ. This reduction in the frequency at which servo information is written is due to a variety of considerations, including the fact that the retrieval of data is accomplished primarily through detecting the presence (or absence) of flux transition pulses from the media; compensation for the effects of factors such as noise and intersymbol interference can hence be sufficiently employed to decode the data, even when the pulses are adjacently disposed. However, proper operation of the servo system requires accurate determination of pulse location and amplitude of the servo information, which is typically difficult to accurately detect in the presence of noise and interference characteristic of information written at the higher frequencies used to store and retrieve the user data.

An MR head incorporates separate write and read elements, the write element comprising an inductive coil about a core with a write gap and the read element comprising a magneto-resistive material having a changed electrical resistance in the presence of a magnetic fields of a predetermined orientation. The increased sensitivity of the MR element allows write pulses from the head to be relatively narrow, facilitating the higher data transfer rates discussed above. The width of the write pulses is primarily a characteristic of the construction of the head so that the low frequency servo information is written with write pulses of the same width as the pulses used to write the data. Due to the lower write frequency, though, servo readback signals generally include pulses that are separated by baseline portions that should ideally have a nominal amplitude of about zero volts (or otherwise a value substantially equal to the reference level being used).

A pervasive problem often associated with the decoding of servo readback signals is baseline shift in such signals. Baseline shift, or shouldering, is characterized by a positive or negative shift in the amplitude of a baseline portion of the signal between adjacent peaks so that the readback signal takes non-zero values at times when a corresponding ideal signal should be close to zero.

Baseline shift is particularly troublesome when present in readback signals obtained from track address fields, as such baseline shift can interfere with the proper identification of the associated track address. It is common to encode track address information in the form of Gray code (GC), which generally comprises a multi-bit sequence, with each value in the sequence corresponding to a physical track address. Unlike a typical binary sequence, however, only one bit in the GC sequence changes as the head moves to each adjacent track, so as to facilitate improved track address detection. Each track is assigned a unique GC value and the total number of GC bits in each value is selected to accommodate the total number of tracks on each disc.

When a head reads a selected track address field (also referred to as a "Gray code" or "GC" field), an analog GC readback signal is obtained which is compared to both positive and negative detection thresholds and digitized into either ones or zeros, depending upon whether the signal is within or beyond the thresholds. A servo demodulator checks the resulting digitized value against the value that the GC field should generate to ensure the head is over the intended track. Thus, when baseline shift in the GC readback signal is sufficiently pronounced, the baseline portions can rise above or below the positive and negative detection thresholds, respectively, resulting in the baseline portion being erroneously detected as a peak.

Although the causes of baseline shift can vary and are not always clearly identifiable, it has been observed that factors such as the relative skew of the head with respect to the track (which varies with disc radius), electrical offsets and mechanical connections in the signal paths between the head and the servo circuit can provide significant contributions to the presence of baseline shift in GC readback signals. Moreover, it has been found that the use of high pass filtering in the preamp circuitry of a disc drive can increase the severity of baseline shift in GC readback signals, the high pass filtering stages utilized to reduce the effects of thermal asperities in the data readback signals.

As track and data bit densities and data transfer rates continue to increase with successive generations of disc drives, it is expected that such factors will generally lead to increases in the severity of baseline shift in servo readback signals. That is, improvements in read channel performance, continually demanded by the marketplace, should be implemented in a manner that does not degrade the performance of the servo circuit, which is often difficult to achieve. Accordingly, it is to the facilitation of continued increases in read channel data transfer rates while maintaining adequate levels of servo circuit performance that the present invention is directed.

SUMMARY OF THE INVENTION

The present invention provides an apparatus and method for removing baseline shift in low frequency readback signals in a disc drive, such readback signals characterized by peaks separated by baseline portions. Baseline shift comprises excessive amplitudes in the baseline portions of the readback signals, which should ideally have a nominal value (such as zero millivolts).

In accordance with a preferred embodiment, the disc drive comprises a head controllably positionable adjacent tracks on a rotatable disc and a servo circuit which controls the position of the head in response to the low frequency readback signals which are obtained as the head reads servo fields on the tracks. An adjustable filter is operably disposed between the head and the servo circuit to provide compensation for the baseline shift in the readback signals.

The presence of baseline shift is first evaluated at a predetermined margin threshold, after which the response characteristics of the adjustable filter are adjusted to remove the detected baseline shift from the readback signals. The adjustable filter preferably comprises an integrative, multi-staged programmable filter which receives programmable inputs from a control processor of the disc drive. The filter characteristics are preferably adjusted for each head-track combination.

These and various other features as well as advantages which characterize the present invention will be apparent from a reading of the following detailed description and a review of the associated drawings.

BRIEF DESCRIPTION OF THE DRAWINGS

FIG. 6 provides a DETECTION THRESHOLD OPTIMIZATION routine representative of programming utilized by the control processor and digital signal processor shown in FIG. 5 to initially characterize the baseline shift for each of a number of selected head-track combinations.

FIGS. 11–13 provide graphical representations of typical readback signals, illustrating the benefits of the operation of the routines of FIGS. 6 and 8.

DETAILED DESCRIPTION

Figure 1:
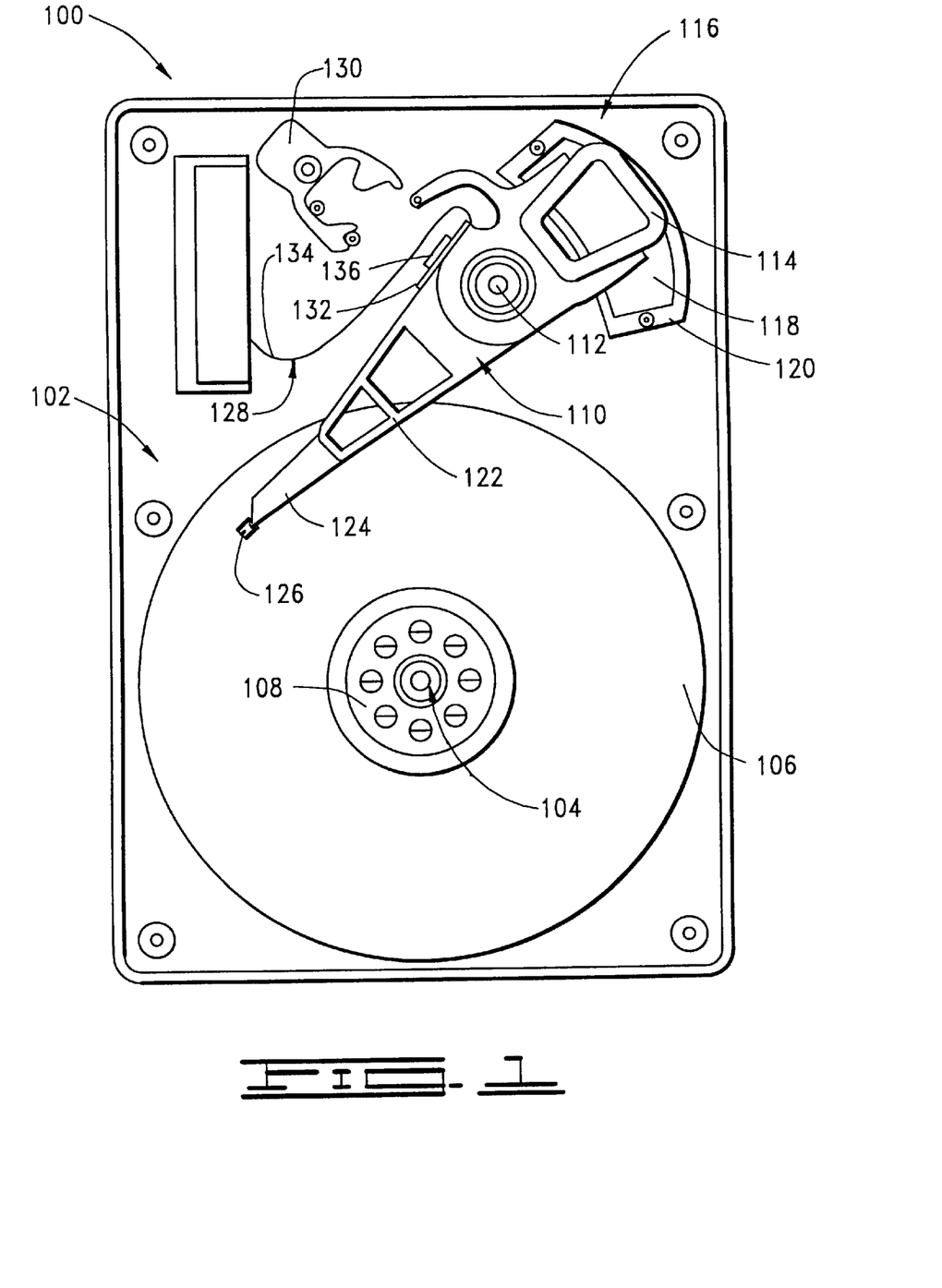
FIG. 1 shows a disc drive constructed in accordance with preferred embodiments of the present invention and includes a plurality of heads which are controllably positionable adjacent the surfaces of a stack of rotatable discs.

Referring to FIG. 1, shown therein is a top plan view of a disc drive 100 constructed in accordance with preferred embodiments of the present invention. The disc drive 100 includes a base deck 102 on which various components of the disc drive 100 are mounted. A top cover (not shown) cooperates with the base deck 102 to form an internal, sealed environment for the disc drive in a conventional manner.

A spindle motor (shown generally at 104) is provided to rotate a plurality of discs 106 at a constant high speed. A disc clamp 108 secures the discs 106 to a hub (not separately designated) of the spindle motor 104.

An actuator assembly 110 rotates about a cartridge bearing assembly 112 in response to the application of current to a coil 114 of a voice coil motor (VCM) 116. As is conventional, the VCM 116 includes a pair of magnetic flux paths disposed above and below the coil 114 so that the current applied to the coil 114 induces a magnetic field in the coil 114 which interacts with the magnetic flux paths of the VCM 116, causing relative movement of the coil 114 and corresponding rotation of the actuator assembly 110 about the cartridge bearing assembly 112. For purposes of clarity, only one of the flux paths of the VCM 116 has been shown in FIG. 1, the flux path including a permanent magnet 118 disposed over a magnetically permeable pole piece 120 which is fabricated from stainless steel.

The actuator assembly 110 further comprises a plurality of actuator arms 122 which project out toward the discs 106, with gimbal assemblies 124 extending from each of the actuator arms 122. Heads 126 are suspended at the ends of the gimbal assemblies 124 and are supported over the surfaces of the discs 106 by air bearings established by air currents set up by the rotation of the discs 106. A flex assembly 128 facilitates electrical connections between the actuator assembly 110 and a disc drive printed circuit board (not shown) mounted to the underside of the disc drive 100, the printed circuit board housing the control circuitry used by the disc drive 100 to control the transfer of data between the discs and a host computer (not shown) in which the disc drive 100 can be mounted. A latch 130 is used to secure the actuator assembly 110 when the disc drive 100 is in a deactivated state.

The flex assembly 128 includes a flex circuit board 132 to which a flex ribbon 134 is attached, as well as head wires (not shown) routed along the actuator assembly 110 from the heads 126. The flex circuit board 132 includes a preamp circuit 136 used during read and write operations to control the operation of the heads 126. More particularly, during a write operation the preamp circuit 136 applies a time-varying write current to a selected head 126 in order to write data to a selected track. During a read operation, the preamp circuit 136 applies read bias currents to the heads 126 and detects changes in voltage across magneto-resistive elements (not separately shown) of the heads 126 to generate readback signals that are subsequently decoded by read channel and servo circuitry (not shown) of the disc drive 100.

Figure 2:
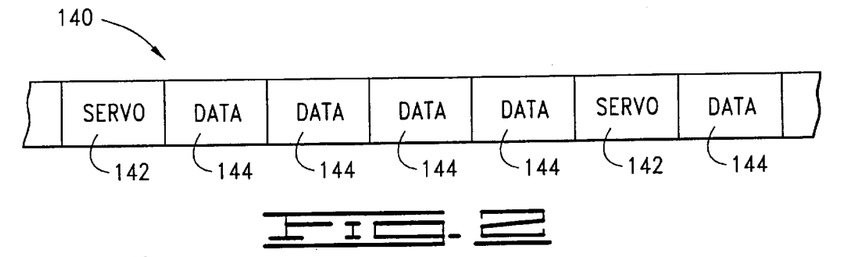
FIG. 2 illustrates a portion of a track on one of the discs of FIG. 1 showing the relative placement of servo fields and data fields.

FIG. 2 provides a generalized representation of a portion of a track 140 of the disc drive 100, showing the relative placement of servo fields 142 and data fields 144 on the track 140. As will be recognized, the servo fields 142 contain servo information used by the servo circuitry to control the position of the heads 126 relative to the track 140 and the data fields (or sectors) 144 contain user data stored to the disc drive 100. The number of data fields 144 between successive servo fields 142 and the relative length of each type of field will depend upon the particular application and radial location on the disc 106.

Figure 3:
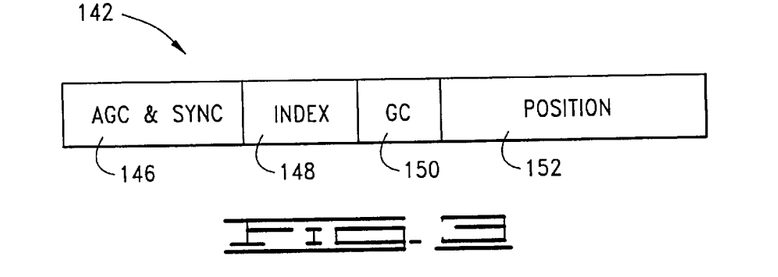
FIG. 3 illustrates various fields associated with the servo fields of FIG. 2, including a Gray code (GC) field in which track address information is stored.

FIG. 3 provides a representation of one of the servo fields 142 of FIG. 2 in greater detail. More particularly, the servo field 142 of FIG. 3 is shown to include an automatic gain control and synchronization (AGC & Sync) field 146, an index field 148, a Gray code (GC), or track address field 150 and a position field 152. Of particular interest is the GC field 150, but generally it will be recognized that the AGC & Sync field 146 provides timing and amplitude information used by the servo circuitry in preparation of receipt of the rest of the servo information in the servo field 142. The index field 148 provides information with regard to the angular displacement of the servo field 142 with respect to the disc 106. The position field 152 provides information with regard to the placement of the head relative to the center of the track 140. Those skilled in the art will appreciate that other servo field configurations can be readily used depending upon the requirements of a particular application, so that the configuration of FIG. 3 is merely illustrative in nature and not limiting to the scope of the claimed invention. The servo information of the servo fields 142 is written at a frequency (for example, about 10–20 MHZ, depending upon the radial position of the servo field 142) which is substantially lower than the frequency at which user data are written to the data fields 144 (for example, about 120–200 MHZ, again depending upon the radial position of the data field 144).

With regard to the GC field 150, a unique GC pattern is written to all such fields on each track, the pattern corresponding to the physical address of the track. As discussed above, proper operation of the servo circuitry requires accurate decoding of the GC readback signal obtained from the GC fields 150. However, attendant problems in the decoding of such signals will now be discussed with reference to FIG. 4, which generally illustrates the effects of baseline shift in a portion of a recovered GC readback signal, denoted at 160. For purposes of discussion, it is contemplated that the signal 160 of FIG. 4 has been obtained from the reading of the GC field 150 of FIG. 3 by the associated head 126 (FIG. 1).

Figure 4:
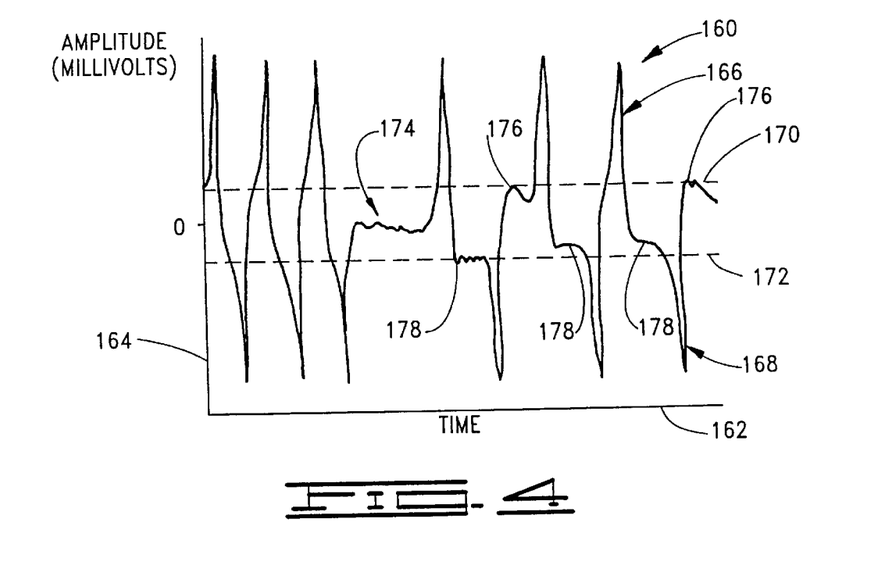
FIG. 4 provides a graphical representation of a readback signal obtained as a selected head from FIG. 1 reads a GC field such as shown in FIG. 3, illustrating the problems associated with baseline shift in the readback signal.

As shown in FIG. 4, the GC readback signal 160 is plotted against an x-axis 162 indicative of elapsed time and a y-axis 164 indicative of signal amplitude (millivolts). The GC readback signal 160 includes a series of positive peaks (denoted generally at 166) and a series of negative peaks (denoted generally at 168). Corresponding positive and negative detection thresholds 170, 172 are also shown, with the detection thresholds used to detect the occurrence of the positive and negative peaks 166, 168.

Ideally, baseline portions between adjacent peaks should have a value near 0 millivolts, such as illustrated at nominal baseline portion 174. However, not all of the baseline portions are so well-behaved; particularly, baseline portions having undesirable positive baseline shift are represented at 176 and baseline portions having corresponding, undesirable negative baseline shifting are represented at 178. As shown in FIG. 4, such shifting is sufficient at some locations to exceed the positive and negative detection thresholds 170, 172, respectively, and would thus likely result in misdetection of the GC readback signal 160 at these locations.

Figure 5:
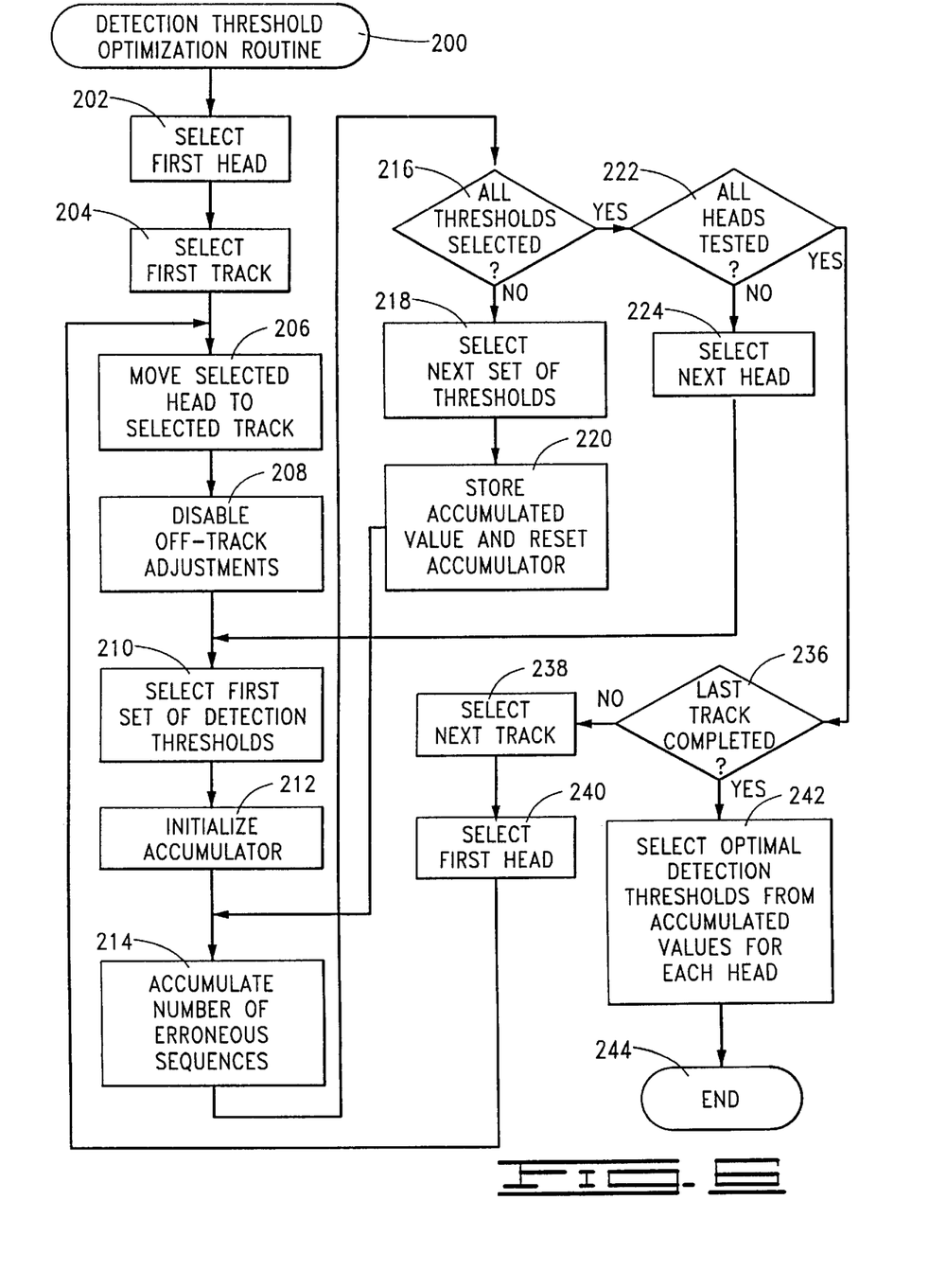
FIG. 5 provides a functional block diagram of a portion of the disc drive of FIG. 1, including a selected head from FIG. 1, a servo circuit which controls the position of the head and a programmable filter operably disposed therebetween, the programmable filter constructed and operated in accordance with preferred embodiments of the present invention.

Referring now to FIG. 5, the construction and operation of the disc drive 100 in accordance with preferred embodiments of the present invention will now be discussed. By way of overview, during the practice of the present invention, the presence of excessive baseline shift in GC readback signals (such as 160 of FIG. 4) for various head-track combinations in the disc drive 100 is evaluated and, for those head-track combinations exhibiting unacceptable amounts of baseline shift, an adjustable filter (180 in FIG. 5, also referred to herein as "programmable filter") is employed to compensate for the same. The programmable filter is preferably integrative and multi-staged, having a construction as follows:

$$H(s) = \left(1 + \frac{\omega_1}{s}\right)\left(1 + \frac{\omega_2}{s}\right)\ldots\left(1 + \frac{\omega_n}{s}\right) \qquad (1)$$

with H(s) being the response of the filter and $\omega_1, \omega_2 \ldots \omega_n$ being selected frequencies of interest that are adjusted as required to obtain the desired response. As discussed in greater detail below, the values for $\omega_1, \omega_2 \ldots \omega_n$ are initially set to zero and subsequently adjusted, or given selected initial values based upon knowledge of the response of other parts of the disc drive 100 (such as the head 126).

By minimizing the presence of baseline shift in the GC readback signals through the use of the programmable filter 180, improvements in track address decoding, as well as other servo system functions, can be advantageously achieved. The methodologies by which this can be carried out will be discussed after a review of the disc drive circuitry of FIG. 5.

As shown in FIG. 5, the programmable filter 180 is operably disposed between a selected head 126 (identified as a magneto-resistive, or MR head) and a servo circuit (identified within dotted outline 182) of the disc drive 100. The programmable filter 180 receives programmable inputs from a control processor 183, the control processor 183 providing top-level control over the operation of the disc drive 100. The control processor 183 is shown to interface with a digital signal processor (DSP) 185 of the servo circuit 182, as shown.

During operation, the head 126 reads a selected GC field (such as 150 of FIG. 3) and provides a readback signal to the preamp circuit 136, which was previously discussed with respect to FIG. 1 as being mounted on the flex circuit board 132, which in turn is attached to the actuator assembly 110. The preamp circuit 136 applies preliminary amplification and filtering of the head readback signal, including high pass filtering to minimize the effects of thermal asperities in the signal. The output from the preamp circuit 136 is provided to an electro-mechanical flex and decoupling network 184, which includes the flex 134 of FIG. 1 as well as a capacitive decoupling network comprising one or more capacitors and resistors arranged in a conventional manner. The output signal is passed through the programmable filter 180, which provides integrative filtering in response to the programmable inputs from the control processor 183.

The output signal from the programmable filter 180 is provided to an automatic gain control (AGC) stage 186 of the servo circuit 182, which applies a variable gain to the signal to maintain the overall signal amplitude range within limits appropriate for the remaining portions of the servo circuit 182. For reference, in cases where baseline shift is present and has not yet been compensated by the programmable filter 180, the output of the AGC stage 186 will be a signal such as the GC readback signal 160 of FIG. 4.

Responsive to the AGC stage 186 is a level comparator and analog to digital (A/D) converter circuit 188 (hereinafter "comparator"). The comparator 188 applies positive and negative detection thresholds to the signal, such as, for example, the thresholds 170, 172 of FIG. 4. The thresholds are initially provided in digital form from a Gray code (GC) detection level circuit 190 and converted to analog form by a digital to analog (D/A) converter 192. The GC detection level circuit 190 can be a functional part of the DSP 185, or can be a separate circuit, as desired.

The thresholds are thus applied to the readback signal so as to generate a two-state analog signal, with a first state corresponding to portions of the readback signal above the positive threshold and below the negative threshold, and a second state corresponding to portions of the readback signal falling within the positive and negative thresholds. The comparator 188 then applies A/D conversion to the two-state analog signal to output a corresponding digital sequence ("GC sequence") to a demodulator 194.

The demodulator 194 uses the GC sequence to identify the physical track address over which the head 126 is disposed. For example, during a track following mode of operation the demodulator compares the received GC sequence to a corresponding, predetermined sequence indicative of the desired track address; differences between these sequences are normally interpreted as an error in the position of the head 126. When the head is improperly positioned over an adjacent track, an erroneous GC sequence is detected, causing the declaration of a servo fault. In response, the DSP 185 will attempt to clear the fault by outputting a current command signal to coil driver circuitry (not shown) of the servo circuit 182 in order to adjust the position of the head back over the desired track.

FIG. 5 is shown to further include an accumulator 196 responsive to the demodulator 194 for accumulating the number of errors detected by the demodulator 196. The accumulator 196 can be a separate circuit, or incorporated as a portion of the operation of the DSP 185.

In a first preferred embodiment, the disc drive 100 evaluates the effects of baseline shift and other anomalous conditions (such as signal asymmetry) present in the GC readback signals (such as 160 of FIG. 4) for various head-track combinations and selects optimal detection thresholds (such as the thresholds 170, 172 of FIG. 4) accordingly. This is carried out through the execution of a DETECTION THRESHOLD OPTIMIZATION routine 200, as set forth by the flow chart of FIG. 6. For reference, the routine is realized in programming utilized by the control processor 183 and the DSP 185.

The routine initially selects the first head 126 to be evaluated, as shown by block 202. As discussed above, the disc drive 100 is contemplated as employing an embedded servo scheme, so that servo information is embedded on the tracks on each surface of each disc 106 as previously discussed with reference to FIG. 2. Accordingly, each of the heads 126 will in turn be selected during the performance of the routine. However, it will be noted that the routine of FIG. 6 can be readily adapted for use in a disc drive employing a dedicated servo scheme, wherein one or more of the surfaces of the discs are selected as dedicated servo surfaces. In such a configuration, servo information is exclusively provided on the surfaces of these discs and the data heads are positioned relative to the remaining disc surfaces in relation to the placement of the heads adjacent the servo surfaces. It follows that in such a disc drive only the servo head or heads would be selected by the routine.

Continuing with FIG. 6, the routine next identifies a first selected track, as indicated by block 204, and moves the head 126 thereto, block 206. Once the selected head 126 has settled onto the selected track and the disc drive 100 has entered a track following mode of operation (so that the selected head 126 is caused to follow the selected track), the servo circuit 182 suspends normal track following activity insofar as the response to detected off-track conditions is concerned, as indicated by block 208. More particularly, the DSP 185 is instructed to ignore reported errors in the location of the head 126 to the extent that the DSP 185 does not cause adjustments in the position of the head 126 to move the head 126 to an adjacent track in response to a detected off-track condition.

A first set of GC detection thresholds (both positive and negative) is then selected, as indicated by block 210. Preferably, with reference to FIG. 5 the GC detection level circuit 190 is provided with digital representations of the first set of thresholds and the D/A 192 provides analog representations of these thresholds to the comparator 188. The accumulator 196 (FIG. 5) is then initialized to a zero count, as indicated at block 212 of FIG. 6.

The routine is now ready to evaluate the effects of the selected detection thresholds and this operation takes place as indicated at block 214, wherein the detection thresholds are used to accumulate a total number of erroneous GC sequences over a plurality of revolutions of the discs 106. More particularly, the servo circuit 182 causes the head 126 to remain over the selected track 140 for a series of consecutive revolutions (for example, 100 revolutions) while the GC fields 150 (FIG. 4) on the selected track are read by the head 126. Although any number of revolutions can be used, it has been found desirable to select a sufficiently large enough number of revolutions in order to obtain a statistically significant sample. For example, disc drives employing embedded servo systems will typically have from about 30 to 90 servo fields 142 per track; hence, using 100 revolutions will provide a total of from about 3,000 to about 9,000 GC field readings, depending upon the configuration of the disc drive. Such a large sampling will generally facilitate a thorough evaluation of the effects of the selected thresholds, as well as the characteristic effects of noise and other factors as discussed below.

In response to the reading of each GC field 150 encountered during these revolutions, a digital GC sequence is determined by the comparator 188 using the set of thresholds selected by the operation of block 210. Each GC sequence is compared to the predetermined sequence for the selected track by the demodulator 190. When an erroneous GC sequence is detected (i.e., a difference is detected between the decoded GC sequence and the predetermined sequence), the servo circuit 182 causes the demodulator 188 to increment a count in the accumulator 196. Normally, the DSP 185 would cause an adjustment in the position of the head 126 in response to the erroneous GC sequence; because this operation is disabled by block 208, however, the DSP 185 instead maintains the head 126 over the selected track, allowing the accumulator 196 to accumulate the total number of erroneous GC sequences.

Once the specified number of revolutions has been completed, the routine of FIG. 6 continues to decision block 216, wherein a determination is made whether all thresholds have been selected; as discussed below, a population of sets of thresholds is provided for sequential evaluation by the routine. When it is determined at decision block 216 that additional thresholds remain, the next set of thresholds is selected at block 218. The accumulated value in the accumulator 196 is then temporarily stored by the DSP 185 and the accumulator 196 is reset to a zero count, as indicated by block 220. The operation of block 214 is then repeated using the next set of thresholds.

The operation of the routine of FIG. 6 thus continues until all the predetermined sets of thresholds have been selected for the selected head, after which the routine continues from decision block 216 to decision block 222, which determines whether all of the heads 126 have been tested. If not, the routine continues from decision block 222 to block 224 wherein the next head 126 is selected for testing. Accordingly, each head 126 in turn is subjected to the operation of blocks 210 through 216, resulting in a set of accumulated values for each head 126 at the first selected track location, the set of accumulated values corresponding to the number of detected erroneous GC sequences for each set of thresholds. For reference, an example of such a set of accumulated values is shown in FIG. 7.

Figure 7:
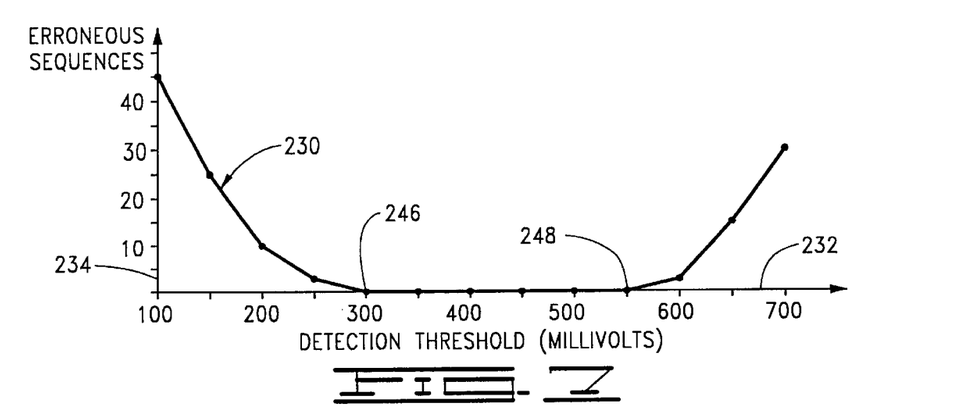
FIG. 7 provides a typical error response curve obtained from the operation of the routine of FIG. 6, from which optimal detection threshold values are determined.

FIG. 7 provides an error response curve 230 plotted against an x-axis 232 indicative of a plurality of detection thresholds (in millivolts) and a y-axis 234 indicative of the total number of accumulated, erroneous GC sequences. For purposes of discussion, it is contemplated that the data shown in FIG. 7 are obtained as a result of the completion of the operation of blocks 210 through 222 of the routine of FIG. 6 for the first selected head 126.

As shown in FIG. 7, a total of 13 sets of detection thresholds were utilized; that is, the first thresholds were ±100 millivolts, the second thresholds were ±150 millivolts, and so on up to thresholds of ±700 millivolts. As will be recognized from the graph, use of the thresholds from ±100 to ±250 and from ±600 to ±700 millivolts resulted in the detection of at least some erroneous GC sequences. The erroneous GC sequences at the thresholds of ±100 to ±250 millivolts were primarily caused by the presence of baseline shift in the GC readback signals; the erroneous GC sequences at the thresholds of ±600 to ±700 millivolts were primarily caused by noise and signal pulse asymmetry. It will be further recognized that no erroneous GC sequences were detected at thresholds from ±300 to ±550 millivolts.

Referring again to the routine of FIG. 6, once all of the heads 126 have been selected in turn (and corresponding erroneous GC sequences values have been accumulated) for the first selected track, the routine passes from decision block 222 to decision block 236, wherein the routine determines whether evaluation has been completed for the last track location. The routine of FIG. 6 is preferably performed at tracks disposed at the innermost and outermost diameters of the discs 106. When additional track locations are to be selected, the routine continues from decision block 236 to block 238, wherein the next track is selected. The first head 126 is then selected at block 240 and the routine continues back to block 206, wherein the first head is moved to the selected track. Accordingly, the routine will continue as before to accumulate values for each head 126 at each of the selected track locations. Interpolation techniques are then applied to arrive at appropriate thresholds for the remaining tracks on the discs 106.

At such time that all of the heads 126 have been evaluated at each of the selected track locations, the routine passes from decision block 236 to block 242, wherein optimal detection thresholds for each head at each location on the discs 106 are selected (after which the routine ends at 244). Generally, the operation of block 242 begins with the step of retrieving the accumulated values for the first head at the first location and identifying the minimum set of threshold values at which no erroneous GC sequences were obtained. With reference to the curve 230 of FIG. 7, this point corresponds to ±300 millivolts, as indicated at 246. The operation of block 242 also identifies the maximum set of threshold values at which no erroneous GC samples were obtained, which for the example of FIG. 7 corresponds to ±550 millivolts, as indicated at 248.

The optimal threshold value is then selected as halfway between the points 246 and 248. More generally, if T is the optimal threshold value to be selected, $T_{min}$ is the minimum value at which no erroneous sequences were detected and $T_{max}$ is the maximum value at which no erroneous sequences were detected, then:

$$T = \frac{(T_{max} - T_{min})}{2} + T_{min} \qquad (2)$$

so that, for the example of FIG. 7, $$T = \frac{(550 - 300)}{2} + 300 = 425 \qquad (3)$$

that is, the optimal detection thresholds for the example of FIG. 7 are at ±425 millivolts. The operation of block 242 in FIG. 6 thus determines optimal thresholds for each head 126 at each of the selected track locations and stores these values for subsequent use by the servo circuit 182 during normal operation. It is contemplated that the operation of block 242 further includes the calculation and storage of thresholds for each track on each disc using conventional interpolation techniques, although the servo circuit 182 can alternatively calculate the optimal thresholds for any given track on-the-fly based upon the thresholds determined at the selected track locations. In another alternative, the servo circuit 182 can determine and store different sets of thresholds for each zone of tracks on the discs.

Figure 8:
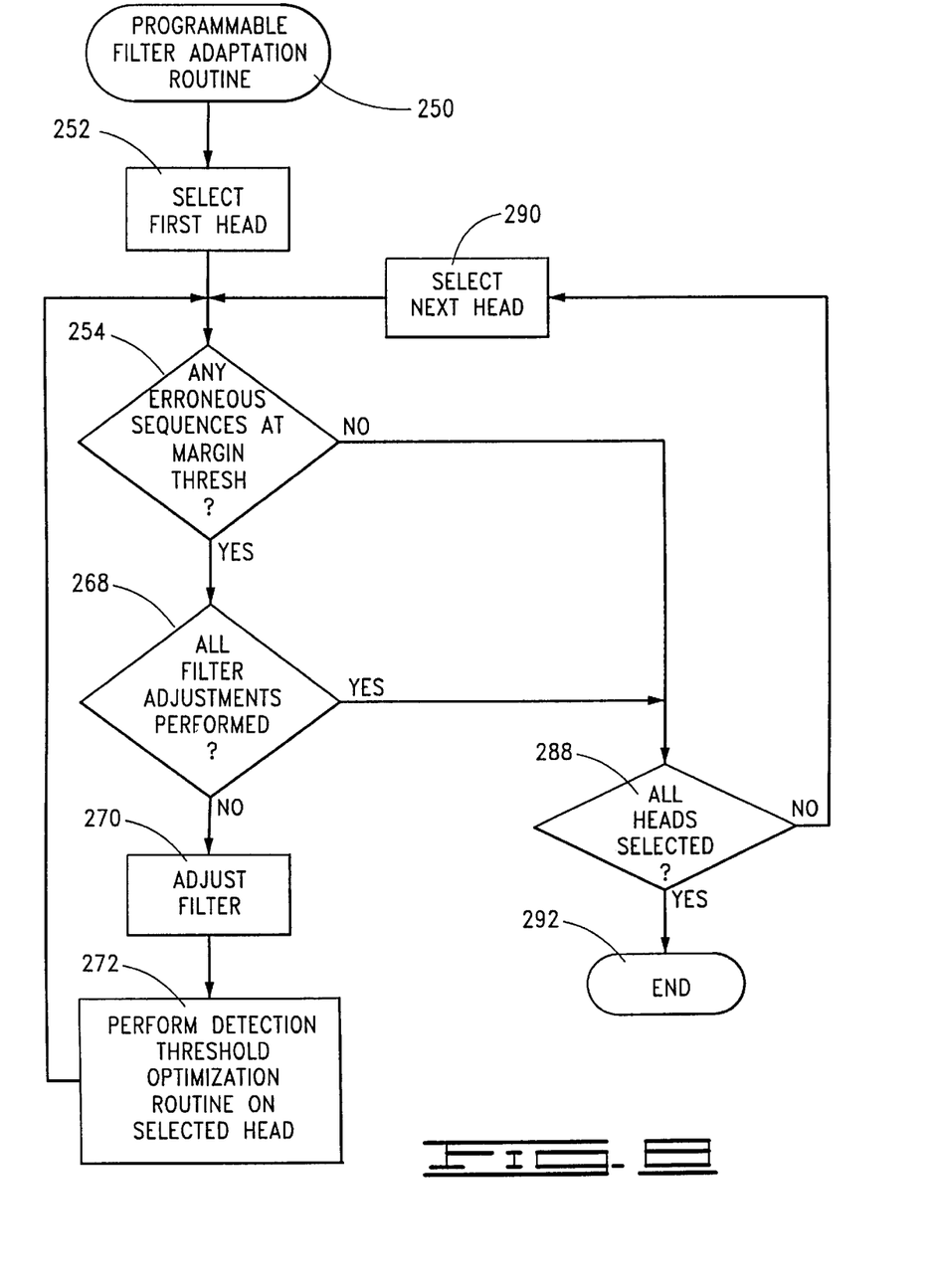
FIG. 8 provides a PROGRAMMABLE FILTER ADAPTATION routine representative of programming utilized by the control processor and digital signal processor of FIG. 5 to adjust the response characteristics of the programmable filter of FIG. 5 to compensate for baseline shift detected by the operation of the routine of FIG. 6.

Once the routine of FIG. 6 has been performed, the disc drive 100 next identifies those head-track combinations having excessive amounts of baseline shift in the GC readback signals obtained therefrom and adjusts the programmable filter 180 (FIG. 5) accordingly. This is accomplished during the execution of a PROGRAMMABLE FIL- TER ADAPTATION routine 250, as shown in FIG. 8. The routine of FIG. 8 is representative of programming utilized by the control processor 183 and the DSP 185.

With reference to FIG. 8, block 252 selects the first head 126 to be evaluated, which is preferably the first head selected during the operation of the routine of FIG. 6. One this head is selected, the routine continues to decision block 254 wherein the error response curves (such as 230 of FIG. 7) for the selected head are evaluated for the presence of baseline shift. More particularly, decision block 254 determines whether any erroneous GC sequences are present at a predetermined margin threshold, which comprises a minimum threshold level at which baseline shift is determined to be unacceptable, such as for example ±250 millivolts.

Figure 9:
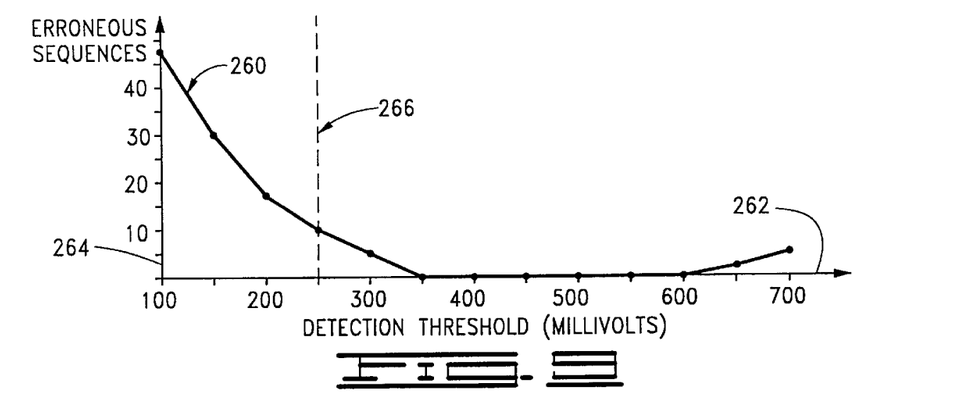
FIG. 9 provides an example of an error response curve obtained from the operation of the routine of FIG. 6 corresponding to a head-track combination in which substantial baseline shift is present.

By way of illustration, FIG. 9 has been provided which shows an error response curve 260 obtained for a selected head 126 as a result of the operation of the routine of FIG. 6. As with the error response curve 230 of FIG. 7, the error response curve 260 of FIG. 9 is plotted against an x-axis 262 indicative of detection thresholds (millivolts) and a y-axis 264 indicative of the total number of detected GC erroneous sequences. As shown in FIG. 9, the error response curve 260 exhibits significant numbers of detected erroneous GC sequences up to thresholds of ±350 millivolts, indicative of the presence of baseline shift in the recovered GC readback signals. Using a margin threshold of ±250 millivolts, as indicated at 266, would therefore result in the presence of erroneous GC sequences at the margin threshold.

Accordingly, the routine passes from decision block 254 to decision block 268, where the routine next checks to determine whether all adjustments to the programmable filter 180 have been performed. As indicated above, the programmable filter 180 preferably comprises a multi-stage filter. Although a variety of high-order responses H(s) could be attained, the programmable filter 180 preferably has the following three-stage construction:

$$H_1(s) = \left(1 + \frac{\omega_1}{s}\right)\left(1 + \frac{\omega_2}{s}\right)\left(1 + \frac{\omega_3}{s}\right) \quad (4)$$

where H,(s) is the transfer function of the programmable filter 180 and frequencies $\omega_1, \omega_2$ and $\omega_3$ are adjusted to obtain the desired response. Although the programmable filter 180 could have any number of stages, real-world constraints such as circuit complexity and processing time will generally tend to require the establishment of some upper limit on the amount of filter adjustability. Moreover, sufficient baseline shift correction will usually be obtained using just one or two stages (i.e., a first or second order filter).

Continuing with FIG. 8, when block 268 determines that this limit has yet to be reached, the flow continues to block 270 wherein the response of the programmable filter 180 is adjusted. In a first approach, the frequencies $\omega_1$, $\omega_2$ and $\omega_3$ (equation (4)) are initially set equal to zero, so that the programmable filter 180 acts as an all-pass filter. The frequency $\omega_1$ is subsequently incremented to a first value by the operation of block 270. The first value for frequency $\omega_1$ can be from a predetermined range of values so that the value of $\omega_1$ is successively incremented at each pass through the routine of FIG. 8. Alternatively, $\omega_1$ can be selected based on knowledge of the existing construction and behavior of upstream components of the disc drive 100, such as the head 126, preamp 136 or the flex and decoupling network 184 (FIG. 5) so as to correspond to a known pole location of one of these components.

Once the programmable filter 180 has been adjusted, the flow continues to block 272 where the DETECTION THRESHOLD OPTIMIZATION routine of FIG. 6 is again performed on the selected head. That is, a new set of GC erroneous sequence data is determined for the selected head 126. For purposes of illustration, FIG. 10 has been provided to show a compensated GC error response curve 280 which is contemplated as being obtained from the selected head 126 after the adjustment of the programmable filter 180 by block 270. The curve 280 is plotted against an x-axis 282 indicative of threshold levels and a y-axis 284 indicative of the number of erroneous sequences.

Figure 10:
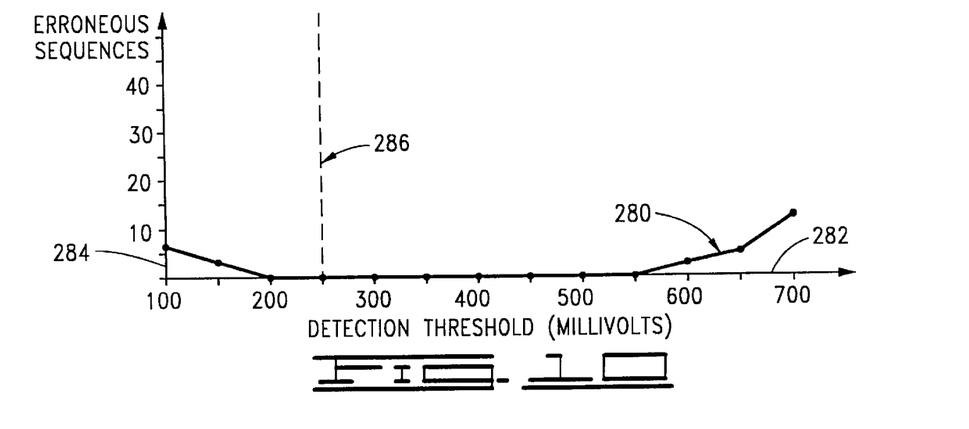
FIG. 10 provides an error response curve for the same head-track combination as FIG. 9, showing the improvement in baseline response as a result of the operation of the routine of FIG. 8.

Once the new error response curve 280 is obtained, the flow of FIG. 8 passes back to decision block 254, where the routine once again determines whether any erroneous GC sequences are present at the margin threshold (±250 millivolts, as shown at 286 in FIG. 10). Because the value of the error response curve 280 at the margin threshold is now zero, the flow of FIG. 8 passes to decision block 288 which determines whether all heads have been selected. If not, the routine passes to block 290 wherein the next head is selected and evaluated. Once all of the heads have been evaluated in turn, and appropriate programmable filter inputs selected and stored, the routine passes from decision block 288 and ends at 292.

Accordingly, the methodology of FIGS. 6 and 8 results in an initial, thorough evaluation of the signal characteristics of each head-track combination, the selection of optimal detection thresholds for subsequent use during GC field demodulation, and the selection of appropriate programmable inputs to remove baseline shift to below a desired level for each head-track combination. Benefits from this approach are generally illustrated by FIGS. 11–13, to which attention is now directed.

Figure 11:
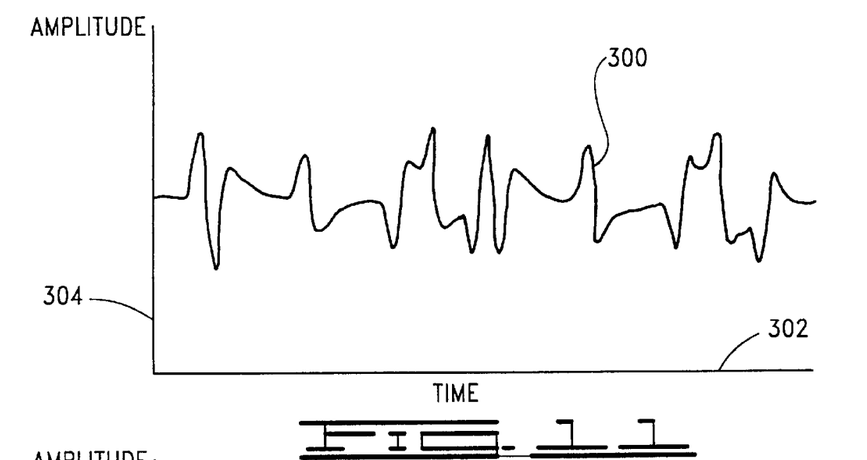
FIG. 11 shows a readback signal with substantial amounts of baseline shift, obtained with the programmable filter configured as an all pass filter.
Figure 12:
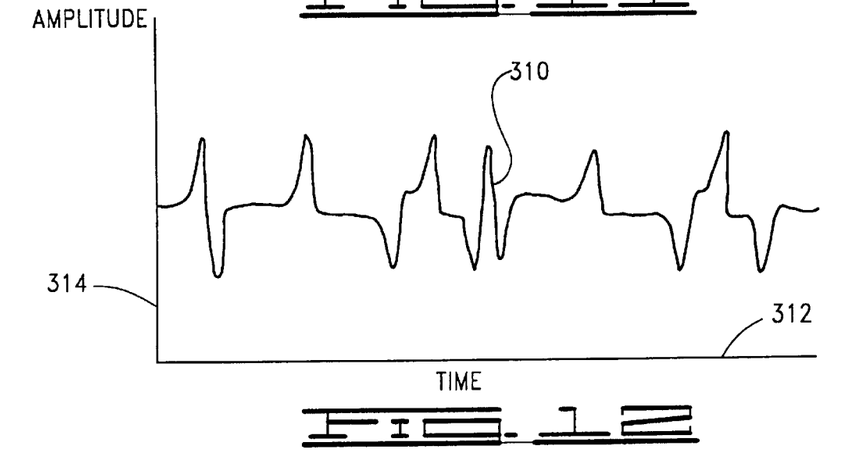
FIG. 12 shows the effect of one pole correction upon the signal and FIG. 13 shows the effect of two pole correction upon the signal.
Figure 13:
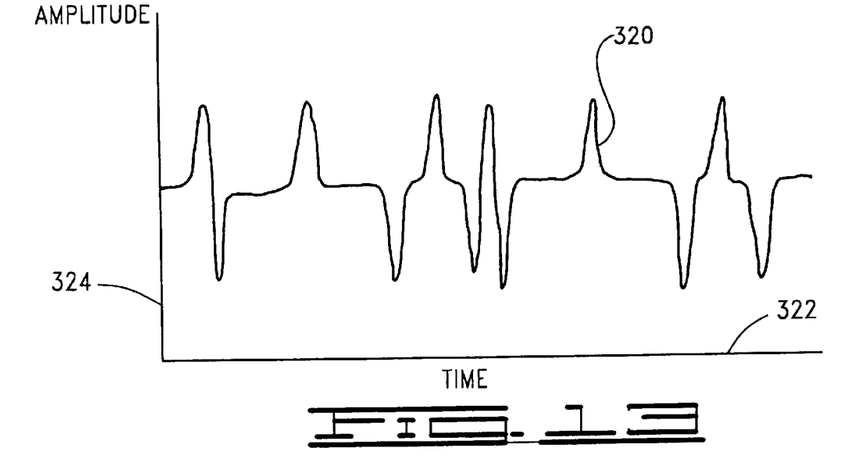

Referring to FIGS. 11–13, shown therein are graphical representations of a portion of a GC readback signal with the application of different amounts of filtering by the programmable filter 180. More particularly, FIG. 11 shows a raw GC readback signal 300 plotted against an x-axis 302 indicative of elapsed time and a y-axis 304 indicative of signal amplitude (millivolts). Substantial baseline shift is evident, primarily caused by harmonics induced by the high pass filtering provided by the preamp circuit 136 (FIG. 5). No compensation is initially provided by the programmable filter 180, as the filter is initially configured as an all-pass filter.

The effects of one pole correction upon the signal are shown in FIG. 12, which illustrates a GC readback signal 310 plotted against corresponding x and y axes 312, 314. The improved response of FIG. 12 is obtained through the proper selection of the pole $\omega_1$ of the programmable filter 180 ($\omega_2$ and $\omega_3$ remaining at zero values). The first order response of the programmable filter 180 provides sufficient baseline shift compensation to allow use of the GC readback signal 310 during servo operation.

Improved results are obtained using an additional filter stage, as shown in FIG. 13. That is, a near-ideal response is achieved using two pole correction, as shown by GC readback signal 320 which is plotted against corresponding x and y-axes 322, 324. Hence, the GC readback signal 320 is obtained through the proper selection of $\omega_1$ and $\omega_2$ ($\omega_3$ of the third stage remaining at a zero value). Using just two of the three stages of the programmable filter 180 allows the uncompensated GC readback signal 300 of FIG. 11 to be filtered to the near-ideal response of the GC readback signal 320 of FIG. 13. The value $\omega_3$ could be additionally used to provide further adjustment of the signal as desired.

As will be recognized from a review of FIGS. 11–13, even in cases where severe amounts of harmonic distortion cause significant baseline shift, the use of a single stage will usually provide sufficient baseline shift compensation to facilitate proper operation of the servo circuit 182. Moreover, near ideal response can usually be achieved through the use of two or more stages. The amount of compensation that is applied will depend upon the requirements of a given application and the factors causing the baseline shift. However, as the poles of the upstream disc drive circuitry (for example the decoupling network and the preamp) usually contribute to baseline shift and have known locations, corresponding poles can be selected for use in the programmable filter 180 to remove the effects thereof without affecting the operation of the read channel.

It will be noted that an important advantage of the methodology set forth above is that, at the completion of the execution of the routines of FIGS. 6 and 8, baseline shift in the servo information will be substantially eliminated (at least to a level below the margin threshold) and optimal GC detection thresholds (such as 170, 172 of FIG. 4) will be established which will provide robust operation of the servo circuit 182 for each head-track combination. Moreover, to the extent that the use of increasing amounts of baseline shift compensation by the programmable filter 180 tends to degrade the ability of the servo circuit 182 to properly decode the GC readback signals at relatively higher threshold levels (i.e., tends to induce additional peak noise or signal asymmetry, which are identifiable at the higher threshold levels), new optimal detection thresholds are selected with each adjustment of the programmable filter 180.

However, it may not always be necessary or desirable to optimize the GC detection thresholds when adjustments to the programmable filter inputs are made. Accordingly, in an alternative preferred embodiment, the presence of baseline shift in the low frequency servo readback signals used by the servo circuit 182 is evaluated for each head in a manner that is independent of the selection of optimal detection thresholds for the head. Heads exhibiting substantial baseline shift can be optimized through the selection of appropriate programmable inputs to the programmable filter 180. If desired, appropriate detection thresholds can be thereafter selected using, for example, the routine of FIG. 6.

Figure 14:
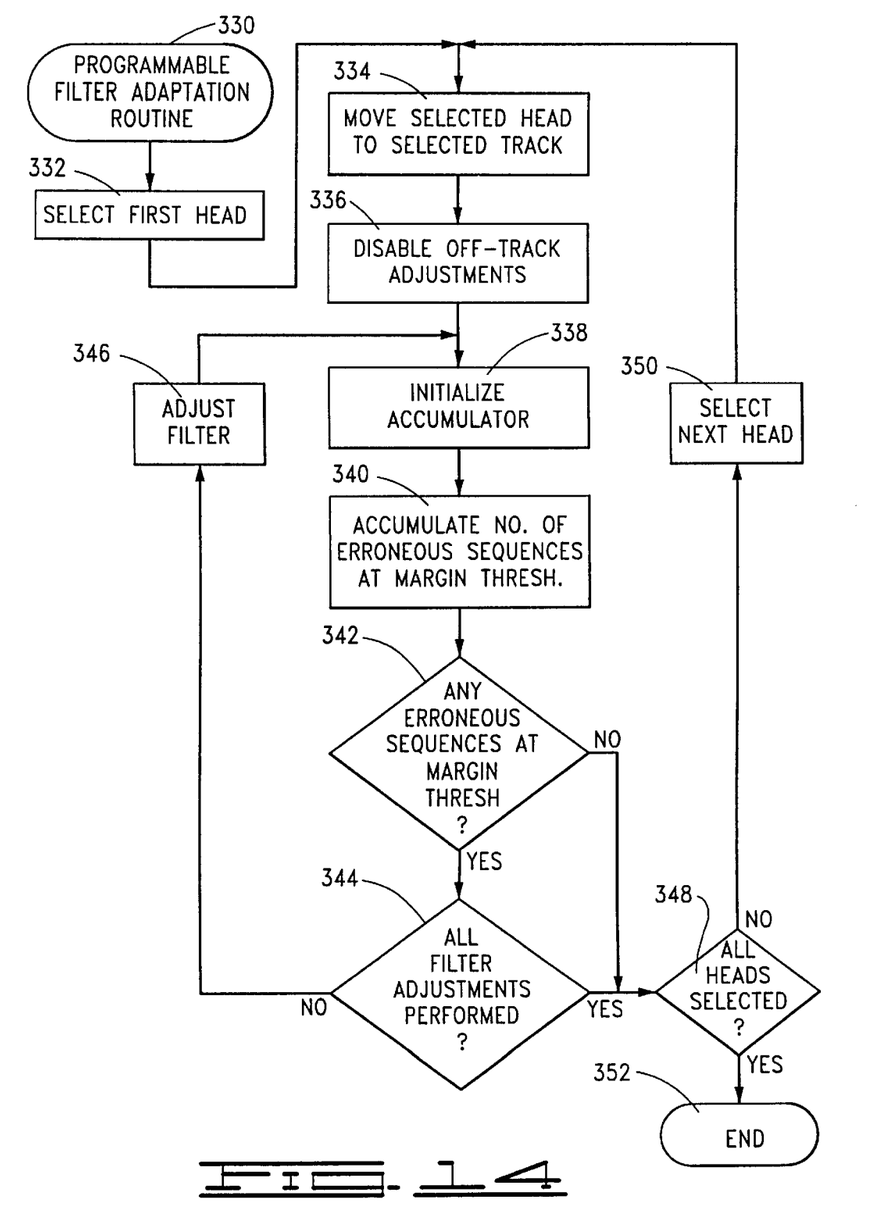
FIG. 14 provides an alternative PROGRAMMABLE FILTER ADAPTATION routine representative of programming utilized by the control processor and digital signal processor of FIG. 5 to adjust the response characteristics of the programmable filter of FIG. 5, the routine of FIG. 14 being an alternative to the routine of FIG. 8.

To illustrate this alternative embodiment, FIG. 14 has been provided which provides an alternative PROGRAMMABLE FILTER ADJUSTMENT routine 330, representative of programming utilized by the control processor 183 and the DSP 185 (FIG. 5). As shown in FIG. 14, the first head to be evaluated is selected at block 332 and moved to a selected track, block 334. Off-track adjustments by the DSP 185 are disabled, block 336 and the accumulator 196 is initialized, block 338.

The disc drive 100 next proceeds at block 340 to accumulate a total number of erroneous GC sequences in the accumulator 196 over a selected number of rotations of the disc 106 using detection thresholds (such as 170, 172 of FIG. 4) set equal to the margin threshold (such as ±250 millivolts, as indicated by 286 of FIG. 10). When the accumulated number of erroneous GC sequences is nonzero, decision block 342, and additional adjustments can be made to the programmable filter inputs, decision block 344, the routine passes to block 346 where the programmable filter 180 is adjusted, after which the head is reevaluated as shown.

When the number of erroneous GC sequences at the margin threshold is equal to zero (decision block 342) or when all of the adjustments have been made to the programmable filter 180 (decision block 344), the flow passes to decision block 348 where the routine determines whether additional heads should be selected. If so, the next head is selected by block 350 and the routine continues, evaluating each head in turn, finally ending at block 352.

It will now be clear that the advantages associated with the routine of FIG. 14 include the fact that the heads 126 are evaluated only at one set of thresholds (i.e., the margin threshold), significantly reducing the time required to set the programmable inputs. This is particularly useful, for example, as part of a field calibration routine performed periodically during disc drive operation (such as, for example, idle periods) when changes in the detection thresholds are deemed unnecessary. Finally, as programmable memory space permits, a selected disc drive might be programmed to carry out both approaches at different times, depending upon the requirements of a particular situation.

Accordingly, in view of the foregoing discussion it will be recognized that the present invention is directed to an apparatus and method for removing baseline shift (such as shown at 176, 178) in low frequency readback signals (such as 160, 300, 310, 320) in a disc drive (such as 100), such readback signals characterized by peaks (such as 166, 168) separated by baseline portions (such as 174, 176, 178).

The disc drive comprises a head (such as 126) controllably positionable adjacent tracks (such as 140) on a rotatable disc (such as 106), a servo circuit (such as 182) which controls the position of the head in response to the readback signals and an adjustable filter (such as 180) operably disposed between the head and the servo circuit.

The presence of baseline shift is detected (such as by 254, 342) at a margin threshold (such as 266), after which the response characteristics of the adjustable filter are adjusted (such as at 270, 346) to remove the detected baseline shift from the readback signals.

For purposes of the appended claims, it will be understood that the term "circuit" will include both hardware and software implementations. Moreover, although the preferred embodiments presented above have utilized track address information arranged in the form of Gray code, it will be recognized that the present invention as claimed is not so limited. Further, the use of the term "signal" in the appended claims will be readily understood to cover both analog and digital implementations.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for removing baseline shift in low frequency disc drive readback signals, the readback signals characterized by peaks separated by baseline portions, wherein the method is performed by a disc drive having a rotatable disc, a head adjacent the disc and a servo circuit for positioning the head relative to tracks on the disc, and wherein the low frequency disc drive readback signals comprise servo signals obtained as the head reads servo fields on a selected track, the servo signals comprising a sequence of track address signals obtained as the head reads each of a plurality of track address fields from the servo fields on the selected track, the servo signals used by the servo circuit to control the position of the head, the method comprising steps of:

(a) detecting the presence of baseline shift in the baseline portions of the readback signals at a predetermined margin threshold, the detection comprising steps of;

(1) disabling adjustment of the position of the head by the servo circuit in response to receipt of an erroneous track address signal from the sequence of track address signals, each erroneous track address signal indicating the head is improperly positioned relative to the selected track; and (2) accumulating a sum indicative of the number of erroneous track address signals detected from the sequence of track address signals; and (b) adjusting response characteristics of an adjustable filter to remove the detected baseline shift at the margin threshold.

2. The method of claim 1, wherein step (b) further comprises a step of:

(1) adjusting the response characteristics of the adjustable filter when the sum exceeds a predetermined limit.

3. The method of claim 1, wherein step (b) further comprises steps of:

(1) configuring the adjustable filter to have a stage with a response of $(1+\omega/s)$, where $\omega$ represents a frequency value; and (2) adjusting the frequency value $\omega$ to compensate for the baseline shift in the servo signal.

4. A disc drive, comprising:

a head controllably positionable adjacent tracks on a rotatable disc, each track including servo fields from which readback signals having peaks separated by baseline portions are obtained as the head reads the servo fields;

a servo circuit which controls head position in response to the readback signals and detects the presence of baseline shift in the readback signals at a margin threshold, the adjustable filter adjusted in response to the detection of the presence of the baseline shift, the servo circuit comprising;

a comparator which generates a plurality of track address sequence signals in response to readback signals obtained from the servo fields on a selected track by comparing the readback signals to the margin threshold;

a demodulator, responsive to the comparator, which identifies erroneous track address sequence signals from the track address sequence signals, each erroneous track address sequence signal indicating that the head is improperly positioned over the selected track; and an accumulator responsive to the demodulator, which accumulates a sum indicative of the total number of erroneous track address sequence signals; and an adjustable filter, operably disposed between the head and the servo circuit, which removes baseline shift from the baseline portions of the readback signals.

5. The disc drive of claim 4, further comprising an adjustment circuit, operably coupled to the adjustable filter, which adjusts a response of the adjustable filter in response to the sum accumulated by the accumulator being above a predetermined limit.

6. The disc drive of claim 5, wherein the adjustment circuit comprises a control processor which controls selected operations of the disc drive, the control processor providing programmable inputs to the adjustable filter to adjust the response of the filter.

7. A method for removing baseline shift in low frequency disc drive readback signals, the readback signals characterized by peaks separated by baseline portions, wherein the method is performed by a disc drive having a plurality of rotatable discs, a plurality of heads adjacent the discs and a servo circuit for positioning the head relative to tracks on the disc, and wherein the low frequency disc drive readback signals comprise servo signals obtained as the head reads servo fields on a selected track, the servo signals used by the servo circuit to control the position of the head, the method comprising steps of:

(a) detecting the presence of baseline shift in the baseline portions of the readback signals at a predetermined margin threshold;

(b) adjusting response characteristics of an adjustable filter to remove the detected baseline shift at the margin threshold;

(c) storing an accumulated detection threshold value for each of the plurality of heads; and (d) optimizing the response characteristics of the adjustable filter for each of the plurality of heads.

8. The method of claim 7, wherein the disc drive comprises a preamp circuit operably connected to the head which provides initial preamplification and threshold detection on readback signals generated by the head, wherein the disc drive further comprises a read channel for decoding data stored on the disc, wherein the servo circuit and the read channel are each responsive to the preamp circuit, and wherein the adjustable filter is disposed between the preamp and the servo circuit so that the low frequency disc drive readback signal is filtered by the adjustable filter and data signals passed to the read channel bypass the adjustable filter.

* * * * *